US012331214B2

(12) United States Patent
Laas et al.

(10) Patent No.: US 12,331,214 B2
(45) Date of Patent: Jun. 17, 2025

(54) RESISTANT 2K-PUR COATINGS

(71) Applicant: Covestro Intellectual Property GmbH & Co. KG, Leverkusen (DE)

(72) Inventors: Hans-Josef Laas, Odenthal (DE); Tanja Hebestreit, Wipperfürth (DE); Yvonne Reimann, Frechen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 723 days.

(21) Appl. No.: 17/617,026

(22) PCT Filed: Jun. 26, 2020

(86) PCT No.: PCT/EP2020/067983
§ 371 (c)(1),
(2) Date: Dec. 7, 2021

(87) PCT Pub. No.: WO2021/001270
PCT Pub. Date: Jan. 7, 2021

(65) Prior Publication Data
US 2022/0363943 A1  Nov. 17, 2022

(30) Foreign Application Priority Data
Jul. 3, 2019 (EP) .................................. 19184068

(51) Int. Cl.
*C09D 175/06* (2006.01)
*C08G 18/28* (2006.01)

(52) U.S. Cl.
CPC ......... *C09D 175/06* (2013.01); *C08G 18/289* (2013.01)

(58) Field of Classification Search
CPC ... C09D 175/06; C09D 167/02; C08G 18/289
See application file for complete search history.

(56) References Cited

U.S. PATENT DOCUMENTS

| | | | |
|---|---|---|---|
| 3,183,112 A | 5/1965 | Gemassmer | |
| 3,640,967 A | 2/1972 | Konig et al. | |
| 3,645,979 A | 2/1972 | Liebsch et al. | |
| 3,996,223 A | 12/1976 | Gupta et al. | |
| 4,255,569 A | 3/1981 | Muller et al. | |
| 4,518,761 A | 5/1985 | Richter et al. | |
| 4,788,310 A | 11/1988 | Stein et al. | |
| 4,826,915 A | 5/1989 | Stein et al. | |
| 4,837,359 A | 6/1989 | Woynar et al. | |
| 4,960,848 A | 10/1990 | Scholl et al. | |
| 4,994,541 A | 2/1991 | Dell et al. | |
| 5,064,960 A | 11/1991 | Pedain et al. | |
| 5,076,958 A | 12/1991 | Pedain et al. | |
| 5,364,955 A | 11/1994 | Zwiener et al. | |
| 5,606,004 A | 2/1997 | Brahm et al. | |
| 5,723,564 A | 3/1998 | Schmalstieg et al. | |
| 5,747,628 A | 5/1998 | Schmalstieg et al. | |
| 5,914,383 A | 6/1999 | Richter et al. | |
| 6,090,939 A | 7/2000 | Richter et al. | |
| 10,472,455 B2 | 11/2019 | Laas et al. | |
| 2002/0103286 A1* | 8/2002 | Speier ................ | C08G 18/8096 524/492 |
| 2002/0142169 A1 | 10/2002 | Hofacker et al. | |
| 2004/0006228 A1 | 1/2004 | Brahm et al. | |
| 2004/0024213 A1 | 2/2004 | Brahm et al. | |
| 2008/0021154 A1 | 1/2008 | Haider et al. | |
| 2008/0057207 A1 | 3/2008 | Poppe et al. | |
| 2008/0245999 A1 | 10/2008 | Poppe et al. | |
| 2010/0015344 A1 | 1/2010 | Groenewolt et al. | |
| 2010/0028544 A1 | 2/2010 | Groenewolt et al. | |
| 2010/0204363 A1 | 8/2010 | Marsh et al. | |
| 2010/0204392 A1 | 8/2010 | Marsh et al. | |
| 2010/0204401 A1 | 8/2010 | Marsh et al. | |
| 2011/0045190 A1 | 2/2011 | Groenewolt et al. | |
| 2011/0269897 A1 | 11/2011 | Groenewolt et al. | |

(Continued)

FOREIGN PATENT DOCUMENTS

| | | |
|---|---|---|
| CA | 2204084 A1 | 11/1997 |
| CA | 2244486 A1 | 2/1999 |
| CN | 101717571 A | 6/2010 |
| CN | 103881050 A | 6/2014 |
| CN | 105218780 A | 1/2016 |
| DE | 870400 C | 3/1953 |
| DE | 953012 C | 11/1956 |
| DE | 1090196 B | 10/1960 |
| DE | 2414413 A1 | 10/1975 |

(Continued)

OTHER PUBLICATIONS

International Search Report, PCT/EP2020/067983, date of mailing: Oct. 1, 2020, Authorized officer: Ralf Buestrich.
Gubbels et al., "Polyesters," in: Ullmann's Encyclopedia of Industrial Chemistry, Wiley-VCH Verlag Gmbh & Co. KgaA, 2018.
Müller, B., "Additive kompakt," Vincentz Network GmbH & Co KG, 2009, 16 pages.
Laas, H.J. et al., J. Prakt. Chem., vol. 336, 1994, pp. 185-200.

*Primary Examiner* — Margaret G Moore
(74) *Attorney, Agent, or Firm* — The Webb Law Firm

(57) ABSTRACT

The invention relates to coating agents containing A) at least one polyol component, B) at least one crosslinking component which is obtained by reacting at least one polyisocyanate with at least one amino functional alkoxy silane and which comprises free and/or blocked isocyanate groups, optionally (C) at least one catalyst for crosslinking silane groups, and D) optionally additional auxiliary agents and additives. The invention is characterized in that the polyol component A) comprises at least one polyester polyol A1) that has been produced using a 2,2,4,4-tetraalkylcyclobutane-1,3-diol (TACD) of the general formula (I), in which independently of one another the groups $R^1$, $R^2$, $R^3$, and $R^4$ represent linear or branched alkyl groups with up to 8 carbon atoms. The invention additionally relates to the use of the coating agents and to substrates which are coated with the coating agents according to the invention.

13 Claims, No Drawings

(56) References Cited

U.S. PATENT DOCUMENTS

| | | |
|---|---|---|
| 2012/0100380 A1 | 4/2012 | Groenewolt et al. |
| 2015/0210886 A1 | 7/2015 | Hoffmann et al. |
| 2016/0122583 A1 | 5/2016 | Groenewolt et al. |
| 2016/0340471 A1 | 11/2016 | Zhou et al. |
| 2018/0002482 A1* | 1/2018 | Inglefield, Jr. ......... C08G 63/60 |
| 2018/0105640 A1 | 4/2018 | Zhou et al. |
| 2018/0112026 A1* | 4/2018 | Laas .................... C08G 18/022 |
| 2018/0244950 A1* | 8/2018 | Laas .................... C09D 175/04 |

FOREIGN PATENT DOCUMENTS

| | | |
|---|---|---|
| EP | 2174967 A1 | 4/2010 |
| GB | 1145952 A | 3/1969 |
| GB | 1244416 A | 9/1971 |
| GB | 1481182 A | 7/1977 |
| JP | S5659828 A | 5/1981 |
| JP | S63260915 A | 10/1988 |

* cited by examiner

RESISTANT 2K-PUR COATINGS

CROSS REFERENCE TO RELATED APPLICATIONS

This application is a national stage application (under 35 U.S.C. § 371) of PCT/EP2020/067983, filed Jun. 26, 2020, which claims benefit of European Application No. 19184068.5, filed Jul. 3, 2019, both of which are incorporated herein by reference in their entireties.

FIELD OF THE INVENTION

The invention relates to novel coating compositions containing polyester polyols based on 2,2,4,4-tetraalkylcyclobutane-1,3-diols and also crosslinker components comprising isocyanate groups and at the same time silane groups, and to the use of these coating compositions for the production of coatings, in particular clearcoats for automotive finishing, as well as the coated substrates.

BACKGROUND OF THE INVENTION

Since being introduced into automotive OEM finishing in the middle of the 1980s, two-component polyurethane (2K PUR) clearcoats have gained steadily in market share by virtue of their superior technological properties in comparison to conventional acrylate/melamine resin coating systems (thermosetting acrylics, TSA coatings).

The present-day 2K PUR clearcoats, which generally contain hydroxy-functional poly(meth)acrylate resins as binders and aliphatic polyisocyanates, especially derivatives of hexamethylene diisocyanate (HDI), as crosslinker components, afford coatings with high mechanical and chemical resistance and very good optical qualities.

In spite of the high quality level already achieved by the 2K PUR coatings, the market has an ongoing interest in coating systems having ever further-improved properties, especially an improved chemical resistance, such as with respect to solvents and tree resin, and scratch resistance.

WO 2010/090712, WO 2010/090714, WO 2010/090715 and WO 2016/187095 propose the use of aliphatic polyesters based on 2,2,4,4-tetramethyl-1,3-cyclobutanediol (TMCD) as a binder component for solvent-containing coating systems having improved solvent and chemical resistance. Such polyester polyols, when mixed with polyacrylate polyols, additionally also reduce the viscosity of the overall system and thus make it possible to formulate coating materials with a lower solvent content. However, at the same time the scratch resistance deteriorates significantly on account of the high glass transition temperature of the TMCD polyesters.

DETAILED DESCRIPTION OF THE INVENTION

As has surprisingly now being found, 2K PUR coatings in which TACD-based polyester polyols are combined with specific silane group-containing polyisocyanates exhibit greatly improved scratch resistance while maintaining a high chemical resistance compared to similar coating materials which have been crosslinked using silane group-free polyisocyanates.

The present invention provides coating compositions containing
A) at least one polyol component,
B) at least one crosslinker component having free and/or blocked isocyanate groups which is obtained by reaction of at least one polyisocyanate with at least one amino-functional alkoxysilane, optionally
C) at least one catalyst for the crosslinking of silane groups, and
D) optionally further auxiliaries and additives,
characterized in that the polyol component A) comprises at least one polyester polyol A1) prepared using a 2,2,4,4-tetraalkylcyclobutane-1,3-diol (TACD) of the general formula (I)

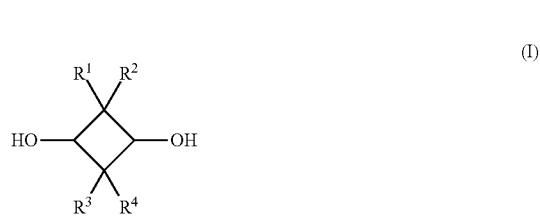

in which the radicals $R^1$, $R^2$, $R^3$ and $R^4$ are independently linear or branched alkyl radicals having up to 8 carbon atoms.

The invention also provides for the use of these coating compositions for producing polyurethane coatings, more particularly for producing clearcoats for automotive finishing.

According to the invention, the references to "comprising", "containing", etc., preferably denote "substantially consisting of" and very preferably denote "consisting of". The further embodiments identified in the claims and in the description can be combined arbitrarily, provided the context does not clearly indicate that the opposite is the case.

The coating compositions according to the invention contain a polyol component A) which comprises at least one polyester polyol A1) prepared using a 2,2,4,4-tetraalkylcyclobutane-1,3-diol (TACD) of the general formula (I)

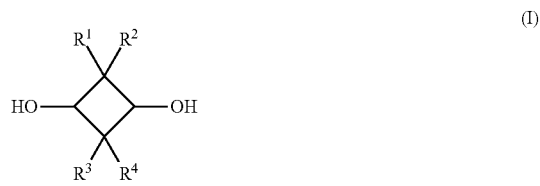

in which the radicals $R^1$, $R^2$, $R^3$ and $R^4$ are independently linear or branched alkyl radicals having up to 8 carbon atoms, preferably having up to 6 carbon atoms, particularly preferably up to 4 carbon atoms and very particularly preferably a methyl radical.

Polyester polyols A1) of this kind are known. They are prepared in a manner known per se, for example by the processes described in WO 2010/090712, WO 2010/090714, WO 2010/090715 and WO 2016/187095, by reaction of TACD of the general formula (I), optionally with co-use of further polyhydric alcohols, with substoichiometric amounts of polybasic carboxylic acids, corresponding carboxylic anhydrides or corresponding polycarboxylic esters of lower alcohols.

Examples of TACDs suitable for the preparation of the polyester polyols A1) used according to the invention include 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethylcyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol and 2,4-diethyl-2,4-diisoamylcyclobutane-1,3-diol. A particularly preferred cyclobutanediol is 2,2,4,4-tetramethylcyclobutane-1,3-diol (TMCD).

Examples of further polyhydric alcohols which may optionally be co-used in the preparation of the polyester polyols A1) are simple polyhydric alcohols having 2 to 14, preferably 4 to 10, carbon atoms, for example ethane-1,2-diol, propane-1,2-diol and -1,3-diol, the isomeric butanediols, pentanediols, hexanediols, heptanediols and octanediols, 2-ethyl-2-butylpropane-1,3-diol, 2-ethyl-2-isobutylpropane-1,3-diol, decane-1,10-diol, dodecane-1,12-diol, cyclohexane-1,2-diol and -1,4-diol, cyclohexane-1,4-dimethanol, 1,4-bis(2-hydroxyethoxy)benzene, 2,2-bis(4-hydroxyphenyl)propane (bisphenol A), 2,2-bis(4-hydroxycyclohexyl)propane (perhydrobisphenol), propane-1,2,3-triol, butane-1,2,4-triol, 1,1,1-trimethylolethane, hexane-1,2,6-triol, 1,1,1-trimethylolpropane (TMP), bis(2-hydroxyethyl)hydroquinone, 1,2,4- and 1,3,5-trihydroxycyclohexane, 1,3,5-tris(2-hydroxyethyl) isocyanurate, 3(4),8 (9)-bis(hydroxymethyl)tricyclo[5.2.1.02,6]decane, ditrimethylolpropane, 2,2-bis(hydroxymethyl)propane-1,3-diol (pentaerythritol), 2,2,6,6-tetrakis(hydroxymethyl)-4-oxaheptane-1,7-diol (dipentaerythritol), mannitol or sorbitol, low molecular weight ether alcohols, for example diethylene glycol, triethylene glycol, tetraethylene glycol, dipropylene glycol or dibutylene glycol, or low molecular weight ester alcohols, for example neopentyl glycol hydroxypivalate, or mixtures of at least two such alcohols.

The TACDs of the type mentioned can be used as the sole diol component in the preparation of the polyester polyols A1). However, it is also possible to use further polyhydric alcohols of the type mentioned, the amounts of these further polyhydric alcohols being chosen so that the TACD content in the total amount of TACD and further polyhydric alcohols used is at least 10 mol %, preferably at least 35 mol %, particularly preferably at least 50 mol %, and very particularly preferably at least 70 mol %.

Carboxylic acids and carboxylic acid derivatives suitable for the preparation of the polyester polyols A1) for use in the coating compositions according to the invention are polybasic carboxylic acids, carboxylic anhydrides thereof and polycarboxylic esters of lower alcohols. These are any aromatic, aliphatic or cycloaliphatic, saturated or unsaturated di- and tricarboxylic acids or anhydrides thereof, in particular those having 4 to 18 carbon atoms, preferably having 4 to 10 carbon atoms, such as succinic acid, succinic anhydride, glutaric acid, adipic acid, pimelic acid, suberic acid, azelaic acid, sebacic acid, decanedicarboxylic acid, maleic acid, maleic anhydride, fumaric acid, itaconic acid, itaconic anhydride, hexahydrophthalic acid, hexahydrophthalic anhydride, tetrahydrophthalic acid, phthalic anhydride, isophthalic acid, terephthalic acid, trimellitic acid, tetrahydrophthalic anhydride, dimethyl terephthalate and bisglycol terephthalate, but also dimeric and trimeric fatty acids, which can be used both individually and in the form of any desired mixtures with one another.

Preferred carboxylic acids and carboxylic acid derivatives for preparation of the polyester polyols A1) are isophthalic acid and adipic acid.

Minor amounts of monocarboxylic acids may optionally also be co-used for preparation of the polyester polyols A1), examples of these being benzoic acid, acetic acid, propionic acid, butyric acid or 2-ethylhexanoic acid.

Suitable polyester polyols A1) for the coating compositions according to the invention are also those as preparable in a manner known per se from lactones and TACD and optionally further polyhydric alcohols, such as those exemplified above, as starter molecules, with ring opening. Examples of suitable lactones for preparing these polyester polyols A1) are β-propiolactone, γ-butyrolactone, γ- and δ-valerolactone, ε-caprolactone, 3,5,5- and 3,3,5-trimethylcaprolactone or any desired mixtures of such lactones.

The preparation of these lactone polyesters is accomplished generally in the presence of catalysts, for example Lewis or Brønsted acids, organotin or organotitanium compounds, at temperatures of 20 to 200° C., preferably 50 to 160° C.

Irrespective of the preparation process and of the nature of the structural components used, the polyester polyols A1) obtained using TACD and used in the coating compositions according to the invention generally comprise a hydroxyl group content of 1.5% to 15% by weight, preferably 2% to 10% by weight, particularly preferably 2.4% to 8% by weight, very particularly preferably 2.8% to 6% by weight, acid numbers of 0 to 80 mg KOH/g, preferably of 0 to 25 mg KOH/g, particularly preferably of 2 to 15 mg KOH/g, very particularly preferably 2 to 10 from 0 to 25 mg KOH/g and number-average molecular weights (Mn) of 300 to 10 000 g/mol, preferably of 500 to 6000 g/mol, particularly preferably of 800 to 5000 g/mol.

The glass transition temperature Tg of the polyester polyols A1) is generally from −35 to 100° C., preferably from −35 to 60° C., particularly preferably from −35 to 50° C.

Suitable polyester polyols A1) for the coating compositions according to the invention are for example the polyesters based on 2,2,4,4-tetramethylcyclobutane-1,3-diol (TMCD) which are commercially available under the trade name Eastman Tetrashield™ from Eastman Chemical Company, Kingsport, USA.

Besides the TACD-based polyester polyols A1), the polyol component A) of the coating compositions according to the invention optionally comprises further polyols A2) different from A1).

Suitable polyols A2) are for example the customary polyhydroxyl compounds known from polyurethane chemistry, such as TACD-free polyester polyols, polyether polyols, polycarbonate polyols and/or polyacrylate polyols, or any mixtures of such polyols.

Suitable TACD-free polyester polyols A2) are, for example, those with an average molecular weight, calculable from functionality and hydroxyl number, of 200 to 3000, preferably of 250 to 2500, having a hydroxyl group content of 1% to 21% by weight, preferably 2% to 18% by weight, as preparable in a manner known per se by reaction of polyhydric alcohols with substoichiometric amounts of polybasic carboxylic acids, corresponding carboxylic anhydrides, corresponding polycarboxylic esters of lower alcohols, or lactones.

Examples of structural components suitable for the preparation of these polyester polyols A2) are—excluding the TACD—the polyhydric alcohols, polybasic carboxylic acids and derivatives thereof mentioned as suitable for the preparation of polyester polyols A1), these also being usable in the form of any desired mixtures.

Polyester polyols A2) can be prepared by methods known per se, such as those described in detail, for example, in E. Gubbels et al., Polyesters. In: *Ullmann's Encyclopedia of Industrial Chemistry*, Wiley-VCH Verlag GmbH & Co. KGaA; 2018. URL: https://doi.org/10.1002/14356007.a21_227.pub2. If necessary, catalytic amounts of standard esterification catalysts, for example acids, bases or transition metal compounds, for example titanium tetrabutoxide, may be used. The esterification reaction is generally conducted within a temperature range from about 80 to 260° C., preferably from 100 to 230° C., until the desired values for the hydroxyl and acid numbers have been attained.

Suitable polyether polyols A2) are, for example, those with an average molecular weight, calculable from functionality and hydroxyl number, of 200 to 6000, preferably 250 to 4000, having a hydroxyl group content of 0.6% to 34% by weight, preferably 1% to 27% by weight, as obtainable in a manner known per se by alkoxylation of suitable starter molecules. For the preparation of these polyether polyols, any desired polyhydric alcohols, including the TACD, as described above as suitable for the preparation of the polyester polyols A1), may be used as starter molecules.

Alkylene oxides suitable for the alkoxylation reaction are especially ethylene oxide and propylene oxide, which can be used in the alkoxylation reaction in any sequence or else in a mixture.

Suitable polycarbonate polyols A2) include in particular the reaction products known per se of dihydric alcohols, for example those mentioned by way of example hereinabove in the list of the polyhydric alcohols, with diaryl carbonates, for example diphenyl carbonate, dimethyl carbonate or phosgene. Suitable polycarbonate polyols A2) further include those that contain not only carbonate structures but also ester groups. These are, in particular, the polyestercarbonate diols, known per se, as obtainable, for example, according to the teaching of DE-B 1 770 245 by reaction of dihydric alcohols with lactones, such as in particular 8-caprolactone, and subsequent reaction of the resultant polyester diols with diphenyl or dimethyl carbonate. Likewise suitable polycarbonate polyols A2) include those that contain not only carbonate structures but also ether groups. These are in particular the polyethercarbonate polyols known per se as obtainable, for example, by the process of EP-A 2 046 861 by catalytic reaction of alkylene oxides (epoxides) and carbon dioxide in the presence of H-functional starter substances.

Suitable polyacrylate polyols A2) are, for example, those with an average molecular weight, calculable from functionality and hydroxyl number or determinable by gel permeation chromatography (GPC), of 800 to 50 000, preferably of 1000 to 20 000, having a hydroxyl group content of 0.1% to 12% by weight, preferably 1 to 10, as preparable in a manner known per se by copolymerization of olefinically unsaturated monomers containing hydroxyl groups with hydroxyl-group-free olefinic monomers.

Examples of suitable monomers for the preparation of the polyacrylate polyols A2) are vinyl and vinylidene monomers such as, for example, styrene, α-methylstyrene, o- and p-chlorostyrene, o-, m- or p-methylstyrene, p-tert-butylstyrene, acrylic acid, acrylonitrile, methacrylonitrile, acrylic and methacrylic esters of alcohols having up to 18 carbon atoms, such as methyl acrylate, ethyl acrylate, n-propyl acrylate, isopropyl acrylate, n-butyl acrylate, isobutyl acrylate, tert-butyl acrylate, amyl acrylate, hexyl acrylate, 2-ethylhexyl acrylate, isooctyl acrylate, 3,3,5-trimethylhexyl acrylate, stearyl acrylate, lauryl acrylate, cyclopentyl acrylate, cyclohexyl acrylate, 4-tert-butylcyclohexyl acrylate, isobornyl acrylate, methyl methacrylate, ethyl methacrylate, n-propyl methacrylate, isopropyl methacrylate, butyl methacrylate, isobutyl methacrylate, tert-butyl methacrylate, amyl methacrylate, hexyl methacrylate, 2-ethylhexyl methacrylate, isooctyl methacrylate, 3,3,5-trimethylhexyl methacrylate, stearyl methacrylate, lauryl methacrylate, cyclopentyl methacrylate, cyclohexyl methacrylate, 4-tert-butylcyclohexyl methacrylate, norbornyl methacrylate or isobornyl methacrylate, diesters of fumaric acid, itaconic acid or maleic acid with alcohols having 4 to 8 carbon atoms, acrylamide, methacrylamide, vinyl esters of alkanemonocarboxylic acids having 2 to 5 carbon atoms, such as vinyl acetate or vinyl propionate, hydroxyalkyl esters of acrylic acid or methacrylic acid having 2 to 5 carbon atoms in the hydroxyalkyl radical, such as 2-hydroxyethyl, 2-hydroxypropyl, 3-hydroxypropyl, 3-hydroxybutyl, 4-hydroxybutyl or trimethylolpropane monoacrylate or monomethacrylate or pentaerythritol monoacrylate or monomethacrylate, and also any desired mixtures of such monomers mentioned by way of example.

Preferred polyol components A2) which may optionally be present in the coating compositions according to the invention in addition to the polyester polyols A1) are TACD-free polyester polyols, polycarbonate polyols and/or polyacrylate polyols of the type mentioned. Particularly preferred polyol components A2) are polyacrylate polyols of the type mentioned.

In the polyol component A) of the coating compositions according to the invention, the TACD-based polyester polyols A1) and the TACD-free polyol components A2) are present in such amounts that the content of polyester polyols A1) in the overall polyol component A) is at least 10% by weight, preferably at least 30% by weight, particularly preferably at least 60% by weight, very particularly preferably at least 80% by weight.

The coating compositions according to the invention contain, as crosslinker component B), at least one product, having free and/or blocked isocyanate groups, of the reaction of at least one polyisocyanate with at least one aminofunctional alkoxysilane.

Suitable polyisocyanates for preparation of the crosslinker component B) are for example any desired diisocyanates and/or polyisocyanates having aliphatically and/or cycloaliphatically bonded isocyanate groups, which are obtainable in various ways, for example by phosgenation in the liquid or gas phase or by a phosgene-free route, for example by thermal urethane cleavage. Preferred aliphatic and/or cycloaliphatic diisocyanates are those from the molecular weight range of 140 to 400, examples being 1,4-diisocyanatobutane, 1,5-diisocyanatopentane (pentamethylene diisocyanate, PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)-isocyanatomethylcyclohexane, bis(isocyanatomethyl)norbornane or mixtures of at least two such diisocyanates.

Suitable polyisocyanates for the preparation of crosslinker component B) are also any polyisocyanates which have been prepared by modification of simple aliphatic and/or cycloaliphatic diisocyanates, for example those of the type mentioned above, and have a uretdione, isocyanurate, allophanate, biuret, iminooxadiazinedione and/or oxadiazinetrione structure, as described for example in J. Prakt. Chem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299 or mixtures of at least two such polyisocyanates. In the course of preparation of these polyisocyanates, the actual modification reaction is generally followed by a further process step for removing the unreacted excess monomeric diisocyanates. The monomers are removed by processes known per se, preferably by thin-film distillation under high vacuum or by extraction with suitable solvents inert to isocyanate groups, for example aliphatic or cycloaliphatic hydrocarbons such as pentane, hexane, heptane, cyclopentane or cyclohexane.

Further suitable polyisocyanates for preparing the crosslinker component B) are any diisocyanates, triisocyanates and/or polyisocyanates having araliphatically and/or aromatically bonded isocyanate groups. In the context of the present invention, araliphatically bonded isocyanate groups are understood to mean isocyanate groups which are bonded to an aromatic ring via an optionally branched alkylene radical, preferably a methylene radical, whereas aromatically bonded isocyanate groups are understood to mean those bonded directly to an aromatic ring.

Suitable polyisocyanates of this type for preparing crosslinker component B) are any desired araliphatic and/or aromatic diisocyanates and triisocyanates which are obtainable in various ways, for example by phosgenation in the liquid or gas phase or by a phosgene-free route, for example by thermal urethane cleavage, and preferably those from the molecular weight range of 160 to 600, such as for example 1,3- and 1,4-bis(isocyanatomethyl)benzene (xylylene diisocyanate, XDI), 1,3- and 1,4-bis(2-isocyanatopropan-2-yl)benzene (tetramethylxylylene diisocyanate, TMXDI), 1,3-bis(isocyanatomethyl)-4-methylbenzene, 1,3-bis(isocyanatomethyl)-4-ethylbenzene, 1,3-bis(isocyanatomethyl)-5-methylbenzene, 1,3-bis(isocyanatomethyl)-4,5-dimethylbenzene, 1,4-bis(isocyanatomethyl)-2,5-dimethylbenzene, 1,4-bis(isocyanatomethyl)-2,3,5,6-tetramethylbenzene, 1,3-bis(isocyanatomethyl)-5-tert-butylbenzene, 1,3-bis(isocyanatomethyl)-4-chlorobenzene, 1,3-bis(isocyanatomethyl)-4,5-dichlorobenzene, 1,3-bis(isocyanatomethyl)-2,4,5,6-tetrachlorobenzene, 1,4-bis(isocyanatomethyl)-2,3,5,6-tetrachlorobenzene, 1,4-bis(isocyanatomethyl)-2,3,5,6-tetrabromobenzene, 1,4-bis(2-isocyanatoethyl)benzene and 1,4-bis(isocyanatomethyl)naphthalene, 1,2-, 1,3- and 1,4-diisocyanatobenzene (phenylene diisocyanate), 2,4- and 2,6-diisocyanatotoluene (tolylene diisocyanate, TDI), 2,3,5,6-tetramethyl-1,4-diisocyanatobenzene, the isomeric diethylphenylene diisocyanates, diisopropylphenylene diisocyanates, diisododecylphenylene diisocyanates and biphenyl diisocyanates, 3,3'-dimethoxybiphenyl 4,4'-diisocyanate, 2,2'-, 2,4'- and 4,4'-diisocyanatodiphenylmethane (MDI), 3,3'-dimethyldiphenylmethane 4,4'-diisocyanate, 4,4'-diisocyanatodiphenylethane, 1,5-diisocyanatonaphthalene (NDI), diphenyl ether diisocyanate, ethylene glycol diphenyl ether diisocyanate, diethylene glycol diphenyl ether diisocyanate, 1,3-propylene glycol diphenyl ether diisocyanate, benzophenone diisocyanate, triisocyanatobenzene, 2,4,6-triisocyanatotoluene, trimethylbenzene triisocyanate, diphenylmethane 2,4,4'-triisocyanate, 3-methyldiphenylmethane 4,6,4'-triisocyanate, the isomeric naphthalene triisocyanates and methylnaphthalene diisocyanates, triphenylmethane triisocyanate, 2,4-diisocyanato-1-[(5-isocyanato-2-methylphenyl)methyl]benzene, 4-methyldiphenylmethane 3,5,2',4',6'-pentaisocyanate or mixtures of at least two such diisocyanates.

Suitable polyisocyanates for preparing the crosslinker component B) are also the polycyclic homologs of diisocyanatodiphenylmethane known as "polymeric MDI".

Particularly suitable aromatic polyisocyanates for preparing crosslinker component B) are the polyisocyanates which are obtainable from monomeric 2,4- and/or 2,6-TDI by reaction with polyols and/or oligomerization, preferably trimerization, and have urethane and/or isocyanurate structure, and which are obtainable by any known methods, described for example in DE-A 870 400, DE-A 953 012, DE-A 1 090 196, EP-A 0 546 399, CN 105218780, CN 103881050, CN 101717571, U.S. Pat. No. 3,183,112, EP-A 0 416 338, EP-A 0 751 163, EP-A 1 378 529, EP-A 1 378 530, EP-A 2 174 967, JP 63260915 or JP 56059828, or mixtures of at least two such polyisocyanates.

Finally, suitable polyisocyanates for preparing crosslinker component B) are also those bearing both aromatic and aliphatic isocyanate groups, for example the mixed trimers or allophanates of 2,4- and/or 2,6-TDI with HDI described in DE-A 1 670 667, EP-A 0 078 991, EP-A 0 696 606 and EP-A 0 807 623.

The preparation of crosslinker component B) preferably uses polyisocyanates having aliphatically and/or cycloaliphatically bonded isocyanate groups, which have a content of monomeric diisocyanates of less than 1% by weight, preferably less than 0.5% by weight, particularly preferably of less than 0.3% by weight, and/or polyisocyanates based on 2,4- and/or 2,6-TDI having a urethane and/or isocyanurate structure, which have a content of monomeric diisocyanates of less than 1.5% by weight, preferably less than 1.0% by weight, particularly preferably of less than 0.5% by weight, based on the solids content of the polyisocyanate. The residual monomer contents are measured according to DIN EN ISO 10283:2007-11 by gas chromatography with an internal standard.

Particularly preferred polyisocyanates for preparing crosslinker component B) are isocyanurate group-containing polyisocyanates of the type mentioned having aliphatically and/or cycloaliphatically bonded isocyanate groups, and also isocyanurate and/or urethane group-containing TDI polyisocyanates, especially low-monomer-content reaction products of 2,4- and/or 2,6-TDI with 1,1,1-trimethylolpropane (TMP) and optionally further preferably low molecular weight alcohols such as diethylene glycol.

Very particularly preferred polyisocyanates for preparing crosslinker component B) are polyisocyanates based on PDI, HDI, IPDI and/or 4,4'-diisocyanatodicyclohexylmethane.

The polyisocyanates mentioned above as suitable, preferred, particularly preferred and very particularly preferred polyisocyanates for preparing crosslinker component B) preferably have an average NCO functionality of 2.3 to 5.0, preferably of 2.5 to 4.5, and a content of isocyanate groups of 6.0 to 26.0% by weight, preferably of 8.0 to 25.0% by weight, particularly preferably 10.0 to 24.0% by weight.

To prepare the crosslinker component B), at least one polyisocyanate of the type mentioned is reacted with at least one amino-functional alkoxysilane.

Suitable amino-functional alkoxysilanes are, for example, aminosilanes of the general formula (II)

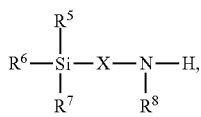

(II)

in which
R⁵, R⁶ and R⁷ are identical or different radicals and are each a saturated or unsaturated, linear or branched, aliphatic or cycloaliphatic or an optionally substituted aromatic or araliphatic radical which has up to 18 carbon atoms and may optionally contain up to 3 heteroatoms from the group of oxygen, sulfur and nitrogen, X is a linear or branched organic radical which has at least 2 carbon atoms and may optionally contain up to 2 imino groups (—NH—),
and
R⁸ is hydrogen, a saturated or unsaturated, linear or branched, aliphatic or cycloaliphatic or an optionally substituted aromatic or araliphatic radical having up to 18 carbon atoms or a radical of the formula

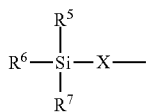

in which R⁵, R⁶, R⁷ and X have the definition given above.

Suitable aminosilanes of general formula (II) are for example 3-aminopropyltrimethoxysilane, 3-aminopropyltriethoxysilane, 3-aminopropylmethyldimethoxysilane, 3-aminopropylmethyldiethoxysilane, 3-aminopropylethyldiethoxysilane, 3-aminopropyldimethylethoxysilane, 3-aminopropyldiisopropylethoxysilane, 3-aminopropyltripropoxysilane, 3-aminopropyltributoxysilane, 3-aminopropylphenyldiethoxysilane, 3-aminopropylphenyldimethoxysilane, 3-aminopropyltris(methoxyethoxyethoxy)silane, 2-aminoisopropyltrimethoxysilane, 4-aminobutyltrimethoxysilane, 4-aminobutyltriethoxysilane, 4-aminobutylmethyldimethoxysilane, 4-aminobutylmethyldiethoxysilane, 4-aminobutylethyldimethoxysilane, 4-aminobutylethyldiethoxysilane, 4-aminobutyldimethylmethoxysilane, 4-aminobutylphenyldimethoxysilane, 4-aminobutylphenyldiethoxysilane, 4-amino(3-methylbutyl)methyldimethoxysilane, 4-amino(3-methylbutyl)methyldiethoxysilane, 4-amino(3-methylbutyl)trimethoxysilane, 3-aminopropylphenylmethyl-n-propoxysilane, 3-aminopropylmethyldibutoxysilane, 3-aminopropyldiethylmethylsilane, 3-aminopropylmethylbis(trimethylsiloxy)silane, 11-aminoundecyltrimethoxysilane, N-methyl-3-aminopropyltrimethoxysilane, N-methyl-3-aminopropyltriethoxysilane, N-(n-butyl)-3-aminopropyltrimethoxysilane, N-(n-butyl)-3-aminopropyltriethoxysilane, N-(2-aminoethyl)-3-aminopropyltrimethoxysilane, N-(2-aminoethyl)-3-aminoisobutylmethyldimethoxysilane, N-(2-aminoethyl)-3-aminopropylmethyldimethoxysilane, N-(2-aminoethyl)-3-aminopropyltris(2-ethylhexoxy)silane, N-(6-aminohexyl)-3-aminopropyltrimethoxysilane, N-benzyl-N-(2-aminoethyl)-3-aminopropyltrimethoxysilane, bis(3-trimethoxysilylpropyl)amine, bis(3-triethoxysilylpropyl)amine, (aminoethylaminomethyl)phenethyltrimethoxysilane, N-vinylbenzyl-N-(2-aminoethyl)-3-aminopropylpolysiloxane, N-vinylbenzyl-N-(2-aminoethyl)-3-aminopropylpolysiloxane, 3-ureidopropyltriethoxysilane, 3-(m-aminophenoxy)propyltrimethoxysilane, m- and/or p-aminophenyltrimethoxysilane, 3-(3-aminopropoxy)-3,3-dimethyl-1-propenyltrimethoxysilane, 3-aminopropylmethylbis(trimethylsiloxy)silane, 3-aminopropyltris(trimethylsiloxy)silane, 3-aminopropylpentamethyldisiloxane or any desired mixtures of such aminosilanes.

Preferred aminosilanes of the general formula (II) are those in which
R⁵, R⁶ and R⁷ are each alkyl radicals having up to 6 carbon atoms and/or alkoxy radicals which contain up to 3 oxygen atoms, with the proviso that at least one of the radicals R⁵, R² and R³⁷ is an alkoxy radical of this kind,
X is a linear or branched alkylene radical having 3 or 4 carbon atoms, and
R⁸ is a saturated linear or branched, aliphatic or cycloaliphatic radical having up to 6 carbon atoms or a radical of the formula

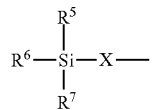

in which R⁵, R⁶, R⁷ and X have the definition given above.

Particularly preferred aminosilanes of the general formula (II) are those in which
R⁵, R⁶ and R⁷ are each methyl, methoxy and/or ethoxy, with the proviso that at least one of the radicals R¹, R² and R³ is a methoxy or ethoxy radical,
X is a propylene radical (—CH₂—CH₂—CH₂—), and
R⁸ is a linear alkyl radical having up to 4 carbon atoms or a radical of the formula

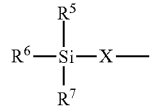

in which R⁵, R⁶, R⁷ and X have the definition given above.

Very particularly preferred aminosilanes of the general formula (II) are N-methyl-3-aminopropyltrimethoxysilane, N-methyl-3-aminopropyltriethoxysilane, N-(n-butyl)-3-aminopropyltrimethoxysilane, N-(n-butyl)-3-aminopropyltriethoxysilane, bis(3-trimethoxysilylpropyl)amine, bis(3-triethoxysilylpropyl)amine or mixtures of at least two such aminosilanes. Suitable starting compounds B) are, for example, also aminosilanes of the general formula (III)

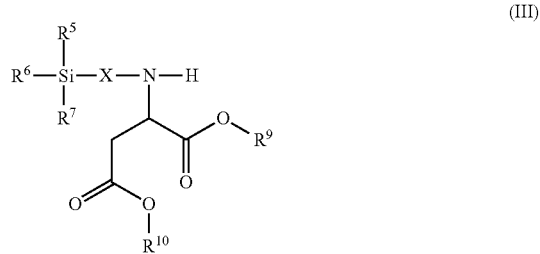

(III)

in which $R^5$, $R^6$ and $R^7$ have the definition given for formula (II),

X is a linear or branched organic radical having at least 2 carbon atoms and $R^9$ and $R^{10}$ independently of one another are saturated or unsaturated, linear or branched, aliphatic or cycloaliphatic or aromatic organic radicals which have 1 to 18 carbon atoms, are substituted or unsubstituted and/or have heteroatoms in the chain.

These aminosilanes of the general formula (III) are the known silane-functional aspartic esters as obtainable according to the teaching of EP-A 0 596 360 by reacting aminosilanes bearing primary amino groups with fumaric esters and/or maleic esters.

Suitable starting compounds for preparation of aminosilanes of the general formula (III) are therefore, in principle, any aminosilanes of the general formula (II)

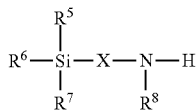
(II)

in which $R^5$, $R^6$, $R^7$ and X have the definition given for formula (II) and $R^8$ is hydrogen.

These are reacted with fumaric diesters and/or maleic diesters of the general formula (IV)

(IV)

in which the radicals $R^9$ and $R^{10}$ are identical or different radicals and are organic radicals having 1 to 18, preferably 1 to 9, particularly preferably 1 to 4, carbon atoms.

Preferred aminosilanes of the general formula (III) are reaction products of aminosilanes of the general formula (II) in which $R^5$, $R^6$ and $R^7$ are each methyl, methoxy and/or ethoxy, with the proviso that at least one of the radicals $R^5$, $R^6$ and $R^7$ is a methoxy or ethoxy radical, X is a propylene radical (—$CH_2$—$CH_2$—$CH_2$—), and $R^8$ is hydrogen, with fumaric diesters and/or maleic diesters of the general formula (IV) in which the radicals $R^9$ and $R^{10}$ are identical or different radicals and are a methyl, ethyl, n-butyl or 2-ethylhexyl radical.

Particularly preferred aminosilanes of the general formula (III) are reaction products of 3-aminopropyltrimethoxysilane and/or 3-aminopropyltriethoxysilane with diethyl maleate.

Suitable amino-functional alkoxysilanes for preparing the crosslinker component B) are also, for example, aminosilanes of the general formula (V)

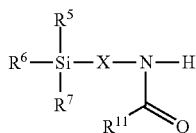
(V)

in which $R^5$, $R^6$ and $R^7$ have the definition given for formula (II),

X is a linear or branched organic radical having at least 2 carbon atoms and $R^{11}$ is a saturated linear or branched, aliphatic or cycloaliphatic organic radical having 1 to 8 carbon atoms.

These aminosilanes of the general formula (V) are the known silane-functional alkylamides as obtainable, for example, by the methods disclosed in U.S. Pat. Nos. 4,788,310 and 4,826,915, by reacting aminosilanes bearing primary amino groups with alkyl alkylcarboxylates with elimination of alcohol.

Suitable starting compounds for preparation of aminosilanes of the general formula (IV) are therefore, in principle, any aminosilanes of the general formula (II)

(II)

in which $R^5$, $R^6$, $R^7$ and X have the definition given above and $R^8$ is hydrogen.

These are reacted with alkyl alkylcarboxylates of the general formula (VI)

(VI), in which $R^{11}$ is hydrogen or a saturated linear or branched, aliphatic or cycloaliphatic organic radical having 1 to 8 carbon atoms and $R^2$ is a saturated aliphatic organic radical having 1 to 4 carbon atoms.

Preferred aminosilanes of the general formula (V) are reaction products of aminosilanes of the general formula (II) in which $R^5$, $R^6$ and $R^7$ are each methyl, methoxy and/or ethoxy, with the proviso that at least one of the radicals $R^1$, $R^2$ and $R^3$ is a methoxy or ethoxy radical, X is a propylene radical (—$CH_2$—$CH_2$—$CH_2$—), and $R^8$ is hydrogen, with alkyl formates of the general formula (VI) in which $R^{11}$ is hydrogen and $R^2$ is a saturated aliphatic organic radical having 1 to 4 carbon atoms.

Particularly preferred aminosilanes of the general formula (V) are reaction products of 3-aminopropyltrimethoxysilane and/or 3-aminopropyltriethoxysilane with methyl formate and/or ethyl formate.

The preparation of crosslinker component B) from at least one polyisocyanate with at least one amino-functional alkoxysilane is known in principle. This can be done, for example, in accordance with one of the methods described in WO 2008/074489, WO 2008/074490, WO 2010/149236, WO 2014/086530 or WO 2009/156148 by reaction at temperatures of 20 to 200° C., preferably 30 to 160° C., particularly preferably at 35 to 120° C., while maintaining an equivalents ratio of isocyanate groups to isocyanate-reactive groups of 50:1 to 1.05:1, preferably of 20:1 to 1.25:1, particularly preferably 10:1 to 1.5:1.

The reaction can be carried out without the use of catalysts. However, it may be advantageous to also use suitable catalysts to accelerate the reaction. Suitable catalysts are in particular the customary catalysts known from polyurethane chemistry, examples including tertiary amines, for example triethylamine, tributylamine, dimethylbenzylamine, diethylbenzylamine, pyridine, methylpyridine, dicyclohexylmethylamine, dimethylcyclohexylamine, N,N,N',N'-tetramethyldiaminodiethyl ether, bis(dimethylaminopropyl)urea, N-methyl- or N-ethylmorpholine, N-cocomorpholine, N-cyclohexylmorpholine, N,N,N',N'-tetramethylethylenediamine, N,N,N',N'-tetramethyl-1,3-butanediamine, N,N,N',N'-tetramethyl-1,6-hexanediamine, pentamethyldiethylenetriamine, N-methylpiperidine, N-dimethylaminoethylpiperidine, N,N'-dimethylpiperazine, N-methyl-N'-dimethylaminopiperazine, 1,2-dimethylimidazole, 2-methylimidazole, N,N-dimethylimidazole-$-phenylethylamine, 1,4-diazabicyclo[2.2.2]octane (DABCO) and bis(N,N-dimethylaminoethyl) adipate, amidines, for example 1,5-diazabicyclo[4.3.0]nonene (DBN), 1,8-diazabicyclo[5.4.0]undec-7-ene (DBU) and 2,3-dimethyl-3,4,5,6-tetrahydropyrimidine, alkanolamine compounds, for example triethanolamine, triisopropanolamine, N-methyldiethanolamine, N-ethyldiethanolamine, dimethylaminoethanol and 2-(N,N-dimethylaminoethoxy)ethanol, N,N',N''-tris(dialkylaminoalkyl)hexahydrotriazines, for example N,N',N''-tris(dimethylaminopropyl)-s-hexahydrotriazine, bis(dimethylaminoethyl) ether and metal salts, for example inorganic and/or organic compounds of iron, lead, bismuth, zinc and/or tin in customary oxidation states of the metal, for example iron(II) chloride, iron(III) chloride, bismuth(III) bismuth(III) 2-ethylhexanoate, bismuth(III) octoate, bismuth(III) neodecanoate, zinc chloride, zinc 2-ethylcaproate, tin(II) octoate, tin(II) ethylcaproate, tin(II) palmitate, dibutyltin(IV) dilaurate (DBTL), dibutyltin(IV) dichloride or lead octoate.

Catalysts to be used with preference are tertiary amines, amidines and tin compounds of the type mentioned.

Particularly preferred catalysts are 1,4-diazabicyclo[2.2.2]octane (DABCO), 1,5-diazabicyclo[4.3.0]nonene (DBN), 1,8-diazabicyclo[5.4.0]undecene-7 (DBU) and dibutyltin(IV) dilaurate (DBTL).

The catalysts mentioned by way of example can be used individually or in the form of any desired mixtures with one another in the preparation of the crosslinker component B), and are used, if at all, in amounts of 0.001% to 1.0% by weight, preferably 0.01% to 0.5% by weight, calculated as the total amount of catalysts used, based on the total amount of polyisocyanates and silane compounds used as starting compounds.

The preparation of crosslinker component B) from at least one polyisocyanate with at least one amino-functional alkoxysilane is conducted solventlessly. If desired, however, suitable solvents inert toward the reactive groups of the starting components can also be used. Examples of suitable solvents are the customary coatings solvents which are known per se, such as, for example, ethyl acetate, butyl acetate, ethylene glycol monomethyl or monoethyl ether acetate, 1-methoxy-2-propyl acetate, 3-methoxy-n-butyl acetate, acetone, 2-butanone, 4-methyl-2-pentanone, cyclohexanone, toluene, xylene, chlorobenzene, white spirit, relatively highly substituted aromatics, as commercialized, for example, under the names solvent naphtha, Solvesso®, Isopar®, Nappar® (Deutsche EXXON CHEMICAL GmbH, Cologne, DE) and Shellsol® (Deutsche Shell Chemie GmbH, Eschborn, DE), but also solvents such as propylene glycol diacetate, diethylene glycol dimethyl ether, dipropylene glycol dimethyl ether, diethylene glycol ethyl and butyl ether acetate, N-methylpyrrolidone and N-methylcaprolactam, or any desired mixtures of such solvents.

The progress of the reaction in the process according to the invention can be monitored by determining the NCO content by titrimetric means, for example.

Irrespective of the type and amount of the starting compounds, the at least one polyisocyanate and the at least one amino-functional alkoxysilane, used in the preparation of the crosslinker components B), said crosslinker components B) for the coating compositions according to the invention are clear, virtually colorless polyisocyanates containing silane groups, which in solvent-free form generally have color numbers below 120 APHA, preferably below 80 APHA, more preferably below 60 APHA, and an NCO content of 1.3% to 24.9% by weight, preferably 4.0% to 23.5% by weight, particularly preferably 5.0% to 21.0% by weight, and a mean NCO functionality of 1.0 to 4.9, preferably of 1.8 to 4.8, particularly preferably of 2.0 to 4.0.

Preferred crosslinker components B) for the coating compositions according to the invention are reaction products of polyisocyanurate polyisocyanates based on PDI and/or HDI with N-(n-butyl)-3-aminopropyltrimethoxysilane, bis(3-trimethoxysilylpropyl)amine or mixtures of N-(n-butyl)-3-aminopropyltrimethoxysilane and bis(3-trimethoxysilylpropyl)amine in a molar ratio of 2.5:97.5 to 97.5:2.5, especially of 5:95 to 95:5, preferably of 10:90 to 90:10, particularly preferably of 20:80 to 80:20, very particularly preferably of 30:70 to 70:30, at which 5% to 95%, preferably 10% to 90%, particularly preferably 15% to 85% of the isocyanate groups originally present in the polyisocyanate have been converted to urea groups.

The crosslinker components B) can optionally also be used in the coating compositions according to the invention in a form in which they are blocked with isocyanate blocking agents known per se from polyurethane chemistry, as one-component PUR baking systems. Examples of suitable blocking agents for this purpose are diethyl malonate, ethyl acetoacetate, activated cyclic ketones, such as cyclopentanone-2-carboxymethyl ester and -carboxyethyl ester, for example, acetone oxime, butanone oxime, E caprolactam, 3,5-dimethylpyrazole, 1,2,4-triazole, dimethyl-1,2,4-triazole, imidazole, benzyl-tert-butylamine, or any desired mixtures of these blocking agents.

The coating compositions according to the invention contain at least one catalyst C) for the crosslinking of silane groups. Catalysts of this kind are any compounds which are capable of accelerating the hydrolysis and condensation of alkoxysilane groups or, preferably, the thermally induced silane condensation.

Examples of suitable catalysts C) are acids, such as organic carboxylic acids, sulfuric acid, p-toluenesulfonic acid, trifluoromethanesulfonic acid, dodecylbenzenesulfonic acid, acetic acid, trifluoroacetic acid, phosphoric monoesters and phosphoric diesters, such as dibutyl phosphate, 2-ethylhexyl phosphate, phenyl phosphate and bis(2-ethylhexyl) phosphate, and also phosphonic diesters and diphosphonic diesters, as described in WO 2007/033786, for example.

Likewise suitable as catalysts C) are also bases, such as the N-substituted amidines 1,5-diazabicyclo[4.3.0]non-5-ene (DBN) and 1,5-diazabicyclo[5.4.0]undec-7-ene (DBU), or else metal salts and metal chelates, such as tetraisopropyl titanate, tetrabutyl titanate, titanium(IV) acetylacetonate, aluminum tri-sec-butoxide, aluminum acetylacetonate, aluminum triflate, tin triflate or zirconium ethylacetoacetate, as described in WO 2006/042658, for example.

Other suitable catalysts C) are phosphoric esters and phosphonic esters of the type stated above that are present in a form blocked with amines, preferably with tertiary amines. Particularly preferred catalysts of this type are those which release the acidic phosphoric and phosphonic esters again in the temperature range of the curing of automotive topcoats and clearcoats, as for example in the range from 100 to 150° C., with elimination of the blocking amine, said esters representing the actually active catalysts. Suitable amine-blocked phosphoric acid catalysts C) are described in WO 2008/074489 and WO 2009/077180, for example.

Likewise suitable catalysts C) are organic sulfonic acids of the type stated above which are used in blocked form, for example in amine-neutralized form, or as adduct with epoxides, as described in DE 2 356 768 B1, and which release the catalytically active sulfonic acids again above 100° C.

Further catalysts C) suitable for crosslinking of silane groups also include tetraalkylammonium carboxylates, such as, for example, tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and/or tetrabutylammonium benzoate.

Catalysts C) suitable for the crosslinking of silane groups are also quaternary ammonium and phosphonium polyfluorides, as known as trimerization catalysts for isocyanate groups from EP-A0 798 299, EP-A0 896 009 and EP-A0 962 455, for example.

Lastly, suitable catalysts C) are also zinc-amidine complexes, which are preparable by the process of WO 2014/016019 by reaction of one or more zinc(II) biscarboxylates with amidines.

Preferred catalysts C) for the crosslinking of silane groups are acidic phosphoric esters, phosphonic esters and sulfonic esters of the stated type, which may optionally be present in amine-blocked form, and also tetraalkylammonium carboxylates of the stated type. Particularly preferred catalysts C) are amine-blocked phosphoric esters and sulfonic acids, and also the stated tetraalkylammonium carboxylates. Very particularly preferred catalysts C) are amine-blocked phenyl phosphate and bis(2-ethylhexyl) phosphate, tetraethylammonium benzoate and tetrabutylammonium benzoate.

Besides the catalysts C) identified by way of example above for silane crosslinking, the coating compositions according to the invention may optionally further also contain urethanization catalysts which are customary in isocyanate chemistry and which accelerate the reaction of the isocyanate groups in crosslinker component B) with the hydroxyl groups in the polyol component A), examples of such catalysts including tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane, N,N'-dimethylpiperazine or metal salts such as iron(III) chloride, zinc chloride, zinc 2-ethylcaproate, tin(II) octanoate, tin(II) ethylcaproate, dibutyltin(IV) dilaurate, zirconium(IV) isopropoxide, zirconium(IV) n-butoxide, zirconium(IV) 2-ethylhexanoate, zirconyl octanoate, bismuth(III) 2-ethylhexanoate, bismuth(III) octoate or molybdenum glycolate.

The catalysts C) are employed in the coating compositions according to the invention as individual substances or in the form of any desired mixtures with one another in amounts of 0.005% by weight up to 5% by weight, preferably of 0.005% by weight up to 2% by weight, particularly preferably of 0.005% by weight up to 1% by weight, calculated as the sum total of all catalysts C) used, and based on the total amount of polyol component A) and crosslinker component B) and.

The coating compositions according to the invention may optionally comprise further auxiliaries and additives D). These are, in particular, the auxiliaries and additives known to the skilled person from coatings technology, such as, for example, solvents, UV stabilizers, antioxidants, water scavengers, leveling agents, rheological additives, slip additives, defoamers, fillers and/or pigments.

In order to reduce the processing viscosity, the coating compositions according to the invention may be diluted with customary organic solvents D1), for example. Solvents suitable for this purpose are, for example, the coatings solvents already described above as solvents for optional accompanying use in the preparation of crosslinker component B), these solvents behaving chemically inertly toward the reactive groups of the coating composition constituents, and having a water content of not more than 1.0% by weight, particularly preferably not more than 0.5% by weight, based on solvent employed.

Suitable UV stabilizers D2) can preferably be selected from the group consisting of piperidine derivatives such as 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-1-4-piperidinyl) sebacate, bis(2,2,6,6-tetramethyl-4-piperidyl) suberate, bis(2,2,6,6-tetramethyl-4-piperidyl) dodecanedioate; benzophenone derivatives such as 2,4-dihydroxybenzophenone, 2-hydroxy-4-methoxybenzophenone, 2-hydroxy-4-octoxybenzophenone, 2-hydroxy-4-dodecyloxybenzophenone or 2,2'-dihydroxy-4-dodecyloxybenzophenone; benzotriazole derivatives such as 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl)phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl)phenol, isooctyl 3-(3-(2H-benzotriazol-2-yl)-5-(1,1-dimethylethyl)-4-hydroxyphenylpropionate), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chloro-2H-benzotriazol-2-yl)-4,6-bis(1,1-dimethylethyl)phenol; oxalanilides such as 2-ethyl-2'-ethoxyoxalanilide or 4-methyl-4'-methoxyoxalanilide; salicylic esters such as phenyl salicylate, 4-tert-butylphenyl salicylate, 4-tert-octylphenyl salicylate; cinnamic ester derivatives such as methyl α-cyano-β-methyl-4-methoxycinnamate, butyl α-cyano-β-methyl-4-methoxycinnamate, ethyl α-cyano-β-phenylcinnamate, isooctyl α-cyano-β-phenylcinnamate; and malonic ester derivatives, such as dimethyl 4-methoxybenzylidenemalonate, diethyl 4-methoxybenzylidenemalonate, dimethyl 4-butoxybenzylidenemalonate. These preferred UV stabilizers can be used either individually or in any desired combinations with one another.

Optionally, one or more of the UV stabilizers D2) mentioned by way of example are added to the coating composition according to the invention, preferably in amounts of 0.001% to 3.0% by weight, particularly preferably 0.01% to 2% by weight, calculated as total amount of UV stabilizers used, based on the total amount of polyisocyanate component A) and hydroxy-functional binder component B).

Suitable antioxidants D3) are preferably sterically hindered phenols, which may preferably be selected from the group consisting of 2,6-di-tert-butyl-4-methylphenol (ionol), pentaerythritol tetrakis(3-(3,5-di-tert-butyl-4-hydroxyphenyl)propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4- methyl-6-tert-butylphenol), and 2,2'-thiodiethyl bis[3-(3,5-di-tert-butyl-4-hydroxyphenyl)propionate]. These may be used as required either individually or in any desired combinations with one another.

These antioxidants D3) are preferably used in amounts of 0.01% to 3.0% by weight, particularly preferably 0.02% to 2.0% by weight, calculated as the total amount of antioxidants used, based on the total amount of polyol component A) and crosslinker component B).

In order to prevent premature crosslinking of silane groups in the coating compositions according to the invention, there may be advantage to adding water scavengers D4), examples being orthoformic esters, such as triethyl orthoformate, or vinylsilanes, such as vinyltrimethoxysilane. These water scavengers are employed, if at all, in amounts of 0.01% by weight up to 5% by weight, preferably of 0.01% by weight up to 2% by weight, based on the total amount of polyol component A) and crosslinker component B).

In order to improve the substrate wetting, the coating compositions according to the invention may optionally comprise suitable leveling agents D5), examples being organically modified siloxanes, such as polyether-modified siloxanes, polyacrylates and/or fluorosurfactants. These leveling agents are employed, if at all, in amounts of 0.01% by weight up to 3% by weight, preferably of 0.01% by weight up to 2% by weight, particularly preferably of 0.05% to 1.5% by weight, based on the total amount of polyol component A) and crosslinker component B).

To optimize application reliability, in particular to avoid the coating material from running off on application to vertical surfaces of the objects to be coated, the coating compositions according to the invention may optionally contain suitable rheological additives D6), for example colloidal silicas, very finely divided bentonites, microcrystalline polyethylene waxes, polyamide dispersions and/or crystalline ureas. Preferred rheological additives D6) are crystalline ureas, such as for example the reaction product of two moles of benzylamine with one mole of HDI, which are typically added to the polyol component as sag control agents (SCA). A range of different polyols which have already been modified with SCAs, for example based on polyester or polyacrylate, are commercially available on the market and can be used as a constituent of polyol component A) in the coating compositions according to the invention for improving the rheological properties.

The slip additives, defoamers, fillers and/or pigments which are likewise optionally present in the coating compositions according to the invention as further auxiliaries and additives D) are known to the skilled person and are employed, if at all, in the amounts customary within coatings technology. A comprehensive overview of such suitable auxiliaries and additives is found for example in Bodo Müller, "Additive kompakt", Vincentz Network GmbH & Co KG (2009).

To produce the coating compositions according to the invention, the above-described components A), B), C) and optionally D) are intimately mixed in any order in succession or together, preferably by means of suitable mixing units, until a homogeneous solution is present. Here, the polyol component A), which contains at least one polyester polyol A1) prepared using TACD, and the crosslinker component B) are usually used in amounts such that for each isocyanate group of crosslinker component B) there are 0.5 to 3.0, preferably 0.6 to 2.0, particularly preferably 0.8 to 1.6, hydroxyl groups of the polyol component A).

The catalyst component C) and also the further auxiliaries and additives D) for optional accompanying use may be added here, optionally even before the actual mixing of the reactive components, either to the polyol component A) or a constituent A1) and/or optionally A2) of the polyol component and/or to the crosslinker component B), in which case the catalyst component C) is added, with particular preference, to the polyol component A) in order to avoid a premature silane condensation.

The coating compositions according the invention obtained accordingly, containing polyisocyanates containing silane groups as crosslinking agents, may be applied by methods known per se, as for example by spraying, spreading, dipping, flow-coating, or with the aid of rollers or knife coaters, in one or more layers.

Substrates contemplated here are any desired substrates, such as metal, wood, glass, stone, ceramic materials, concrete, rigid and flexible plastics, textiles, leather and paper, which prior to coating may optionally also be provided with customary known primers, primer-surfacer systems, basecoat systems and/or clearcoat systems.

The coating compositions according to the invention find use preferably in areas of application where a coating is subject to exacting requirements in terms of optical quality and resistance to mechanical scratching. These include, in particular, decorative, protective and/or effect-imparting coatings and paint systems of high scratch resistance on motor vehicle bodies, such as, for example, motorcycles, buses, trucks or automobiles, or on parts thereof. The coating compositions according to the invention are especially suitable for producing coatings and paint systems, particularly clearcoats, in automotive refinishing and also in automotive OEM finishing.

Here, the coating compositions according to the invention are preferably also used in the clearcoat or topcoat layer of multilayer constructions, particularly in the context of multistage coating methods, wherein first a pigmented basecoat layer and thereafter a layer of the coating composition according to the invention are applied to an optionally precoated substrate.

A further object of the present invention relates to a method for coating surfaces, comprising the steps of
  a) applying the coating composition according to the invention to a substrate; and
  b) curing the coating composition.

The coating compositions according to the invention are processed preferably by spray application methods, such as, for example, compressed air spraying, airless spraying, high-speed rotation, electrostatic spray application (ESTA), optionally in conjunction with hot spray applications such as hot air spraying, for example. The individual constituents of the coating compositions according to the invention, particularly the components A) and B) that are reactive with one another, are preferably not mixed in these spray application activities until immediately prior to processing; mixing may take place advantageously in so-called two-component units.

The coating compositions according to the invention may be cured immediately following application or after a certain flash-off time has been observed. The flash-off time serves, for example, for the leveling and for the degassing of the coating layers, or for the evaporation of volatile constituents, such as solvents, for example. The required duration of the flash-off time may be controlled in a targeted way by means, for example, of application of elevated temperatures and/or by means of a reduced atmospheric humidity.

The ultimate curing of the applied coating compositions according to the invention takes place, finally, by customary and known methods, such as heating in a circulating-air oven, irradiation with IR lamps or near infrared (NIR radiation), preferably in a temperature range from 30 to 200° C., particularly preferably 40 to 190° C. and very particularly preferably 50 to 180° C., for a time of 1 min up to 12 h, particularly preferably 2 min up to 6 h and very particularly preferably 3 min up to 4 h.

The method is preferably employed for the coating of surfaces in the fields of application stated earlier on above.

The coatings produced in this way from the coating compositions according to the invention, these coatings preferably constituting clearcoats, are notable for extraordinarily high scratch resistance and also for very good solvent and chemical resistance.

The present invention further provides for the use of the coating compositions according to the invention for producing coatings and paint systems.

Said coatings and paint systems are preferably used for producing clearcoats.

Particularly preferred is the use of the coating compositions according to the invention for producing coatings and paint systems in automotive refinishing and in automotive OEM finishing.

The present invention further relates to substrates which have been coated with one or more coating compositions according to the invention.

The substrate is preferably selected from the group consisting of metal, wood, wood-based materials, glass, stone, ceramic materials, mineral building materials, rigid and flexible plastics, textiles, leather and paper.

The examples which follow serve to illustrate the invention. They are not intended to restrict in any way the scope of protection of the claims.

EXAMPLES

All percentages are based on weight, unless stated otherwise.

NCO contents were determined titrimetrically in accordance with DIN EN ISO 11909:2007-05.

All viscosity measurements were recorded with a Physica MCR 51 rheometer from Anton Paar Germany GmbH (DE) in accordance with DIN EN ISO 3219:1994-10 at a shear rate of 250 s-1.

The flow time was determined in accordance with DIN EN ISO 2431:2012-03 using an ISO flow cup with a 5 mm nozzle.

To produce automotive clearcoats, the polyols described below were in each case mixed, by intensive stirring at room temperature to form a homogeneous mixture, with a 10% solution of a customary leveling additive in butyl acetate (BYK 331; BYK-Chemie GmbH, Wesel, DE), the light stabilizers Tinuvin 292 and Tinuvin 384-2, each as a 50% solution in MPA, (BASF SE, Ludwigshafen, DE) and also, in the case of the formulations according to the invention from examples 2 and 4, tetraethylammonium benzoate (Sigma-Aldrich Chemie GmbH, Munich, DE) as a 50% solution in butanol as catalyst C). The respective polyisocyanates were stirred into this coating base component and the solids content of the complete coating composition was adjusted to a flow time of approximately 28 s with methoxypropyl acetate.

Table 1 shows the compositions of the individual formulations.

To determine the König pendulum damping (in accordance with DIN EN ISO 1522) and to test the solvent resistance, the coating compositions were each applied to glass plates using a gravity-fed cup gun and, after flashing off at room temperature for 10 minutes, cured at 140° C. within 22 minutes.

To test the coatings for solvent resistance, small amounts of each of the solvents xylene (X), 1-methoxy-2-propyl acetate (MPA), ethyl acetate (EA) and acetone (A) were placed in test tubes and provided with a cotton-wool pad at the opening, thus forming a solvent-saturated atmosphere within the test tubes. The test tubes were subsequently brought with the cotton-wool pad onto the surface of the coating film applied to glass, where they remained for 5 minutes. After the solvent had been wiped off, the film was examined for destruction/softening/loss of adhesion and rated (0=no change, 5=film completely dissolved). The evaluations reported are those for the four solvents in the order in each case of X, MPA, EA and A in the form of four successive digits.

The scratch resistance and also the resistance to fuels and chemicals were tested on the complete OEM multilayer construction on steel sheet.

For this purpose, the coating compositions were applied as clearcoats to cathodically electrocoated metal sheets using a gravity-fed cup gun, the metal sheets having been coated beforehand with a commercial 1K OEM waterborne primer-surfacer and with a conventional black 1K OEM waterborne basecoat. While the waterborne primer-surfacer was cured fully by baking at 165° C. for 20 minutes, the waterborne basecoat was merely subjected to preliminary drying at 80° C. for 10 minutes. Following the application of the clearcoats, the basecoat layer and the clearcoat layer were cured together at 140° C. over the course of 22 minutes.

Wet scratching was conducted using an Amtec-Kistler laboratory car wash in accordance with DIN EN ISO 20566, dry scratching was measured using a crockmeter and polishing paper in accordance with DIN 55654, Method A (cuboidal friction pin geometry, base area (22 mm×22 mm), testing force (22.0±0.5) N.

The gloss of the coatings obtained was measured by reflectometry to DIN EN ISO 2813 at the 200 angle.

The figure reported is the loss of gloss in Gloss Units (GU) after scratching (10 cycles). The lower the loss of gloss in GU, the more resistant the coating is to wet scratching.

A FAM test was conducted to measure the resistance to fuels. A small cotton-wool pad soaked with FAM solution according to DIN 51604-1 as the test substance was placed on the surface of the coating and covered with a watch glass to prevent evaporation. After an exposure period of 10 minutes, the cotton wool soaked with the test substance was removed, the exposed area was dried and immediately inspected visually and manually by touching and scratching. Softening and discoloration of the coating surface are assessed as follows:

0=no changes; 1=swelling ring, hard surface, only visible change/traces of change in hue; 2=swelling ring, slight softening/slight change in hue; 3=distinct softening (possibly slight blistering)/medium change in hue/surface can be scratched; 4=significant softening (possibly severe blistering), can be scratched through to the substrate/significant change in hue; 5=coating completely destroyed without outside influence/very significant change in hue.

The chemical resistance test using a gradient oven was conducted in accordance with DIN EN ISO 2812-5:2007-05.

Table 2 shows a comparison of the results of the performance tests, each determined after a storage time of 24 h at 23° C.

Starting Compounds Used

Desmodur N 3390 BA/SN:

Aliphatic polyisocyanurate polyisocyanate based on HDI (Covestro Deutschland AG, Leverkusen), 90% solution in n-butyl acetate/solvent naphtha 100 (1:1), NCO content: 19.6%, viscosity at 23° C.: 550 mPas.

Silane-Functional Polyisocyanate P1:

42.0 parts by weight of a commercial solvent-free polyisocyanurate polyisocyanate based on HDI (Desmodur N 3300, Covestro Deutschland AG, Leverkusen) with an NCO content of 21.8% and a viscosity at 23° C. of 3000 mPas were initially charged together with 36.0 parts by weight of n-butyl acetate at 25° C. and to this initial charge was added, within 120 min, a mixture of 2.0 parts by weight of N-[3-(trimethoxysilyl)propyl]butylamine and 20.0 parts by weight of bis[3-(trimethoxysilyl)propyl]amine. A polyisocyanate containing silane groups was obtained after a further stirring time of 30 min. The NCO content of the solution was 6.3%, the viscosity of the 64% solution was 90 mPas at 23° C.

Eastman Tetrashield IC3020:

Polyester polyol based on 2,2,4,4-tetramethylcyclobutane-1,3-diol (TMCD) (Eastman Chemical Company, Kingsport (Tenn.), US), 75% solution in n-butyl acetate, OH number (based on form as supplied): 150 mg KOH/g, viscosity at 23° C.: approximately 6000 mPas.

Setalux 91767 VX-60:

Sag control agent-modified polyacrylate polyol (Allnex Germany GmbH, Bitterfeld-Wolfen, DE), 60% solution in solvent naphtha/xylene (76/24), OH number (based on form as supplied): 90 mg KOH/g.

Setalux D A 665 BA/X

Polyacrylate polyol (Allnex Germany GmbH, Bitterfeld-Wolfen, DE), 65% solution in butyl acetate/xylene (75:25), OH number: 150 mg KOH/g (based on form as supplied), viscosity at 23° C.: approx. 2400 mPas.

TABLE 1

Clearcoat formulations. All figures in parts by weight unless otherwise stated.

| Example | 1 (comparative) | 2 | 3 (comparative) | 4 | 5 (comparative) |
|---|---|---|---|---|---|
| Component A | | | | | |
| Eastman Tetrashield IC3020 | 90.89 | 60.25 | 76.43 | 51.02 | — |
| Setalux 91767 VX-60 | — | — | 23.89 | 15.84 | 26.11 |
| Setalux D A 665 BA/X | — | — | — | — | 96.41 |
| Byk 331, 10% in BA | 0.23 | 0.23 | 0.23 | 0.23 | 0.23 |
| Tinuvin 292, 50% in MPA | 2.30 | 2.30 | 2.30 | 2.30 | 2.30 |
| Tinuvin 384-2, 50% in MPA | 3.45 | 3.45 | 3.45 | 3.45 | 3.45 |
| Tetraethylammonium benzoate, 50% in butanol | — | 2.30 | — | 2.30 | — |
| Methoxypropyl acetate (MPA) | 48.76 | 22.34 | 44.64 | 20.03 | 29.89 |
| Component B | | | | | |
| Desmodur N 3390 BA/SN | 52.07 | — | 52.86 | — | 45.41 |
| Polyisocyanate P1) | — | 109.13 | — | 111.54 | — |
| Methoxypropyl acetate (MPA) | 10.50 | — | 5.00 | — | 41.68 |
| Description | | | | | |
| Total parts by weight | 208.20 | 200.0 | 208.8 | 206.81 | 245.48 |
| NCO:OH | 1:1 | 1:1 | 1:1 | 1:1 | 1:1 |
| Solids content on application [%] | 57.3 | 59.6 | 57.1 | 57.6 | 48.6 |

TABLE 2

Test results

| Example | | 1 (comparative) | 2 | 3 (comparative) | 4 | 5 (comparative) |
|---|---|---|---|---|---|---|
| Tests on glass plate as per description | | | | | | |
| Layer thickness on glass | [µm] | 51 | 50 | 46 | 51 | 44 |
| Pendulum hardness | [s] | 212 | 209 | 214 | 213 | 204 |
| Incipient solubility 5' (X, MPA, EA, A) | (0-5) | 0024 | 0000 | 0022 | 0001 | 0024 |
| Tests on the complete cathodic electrocoat/primer-surfacer/basecoat/clearcoat construction as per description | | | | | | |
| FAM Test 10 min. | (0-5) | 2 | 1 | 1 | 1 | 2 |
| Wet scratching | | | | | | |
| Starting gloss 20° | [GU] | 86 | 88 | 88 | 88 | 90 |
| Gloss after scratching 20° | [GU] | 47 | 74 | 55 | 74 | 62 |
| Loss of gloss after 10 cycles | Δ | 39 | 14 | 33 | 14 | 28 |

TABLE 2-continued

Test results

| Example | | 1 (comparative) | 2 | 3 (comparative) | 4 | 5 (comparative) |
|---|---|---|---|---|---|---|
| Gloss after recovery for 2 h at 60° C. 20° | [GU] | 51 | 77 | 59 | 77 | 81 |
| Residual gloss before recovery | [rel. %] | 55 | 84 | 63 | 84 | 69 |
| Residual gloss after recovery | [rel. %] | 59 | 88 | 67 | 88 | 90 |
| Dry scratching crockmeter (polishing paper) | | | | | | |
| Starting gloss 20° | [GU] | 86 | 88 | 88 | 88 | 90 |
| Gloss after scratching 20° | [GU] | 15 | 59 | 30 | 53 | 30 |
| Loss of gloss after 10 cycles | Δ | 71 | 29 | 58 | 35 | 60 |
| Gloss after recovery for 2 h at 60° C. 20° | [GU] | 21 | 68 | 39 | 65 | 77 |
| Residual gloss before recovery | [rel. %] | 17 | 67 | 34 | 60 | 33 |
| Residual gloss after recovery | [rel. %] | 24 | 77 | 44 | 74 | 86 |
| Chemical resistance gradient oven | | | | | | |
| Tree resin | [° C.] | 42 | >68 | 52 | >68 | 40 |
| Pancreatin | [° C.] | 36 | 36 | 40 | 36 | 36 |
| Distilled water | [° C.] | 49 | 50 | 62 | 64 | >68 |
| Sodium hydroxide solution, 1% | [° C.] | 50 | 50 | 54 | 44 | 48 |
| Sulfuric acid, 1% | [° C.] | 48 | 44 | 45 | 43 | 44 |

All coating materials cured to form hard, high-gloss coatings. Compared to the comparative coating material from example 5, which was formulated exclusively using polyacrylate polyols, all coating materials containing the polyester polyol based on 2,2,4,4-tetramethylcyclobutane-1,3-diol (examples 1 to 4, according to the invention and comparative) displayed improved chemical resistance. While the comparative coating materials from examples 1 and 3 crosslinked with the standard polyisocyanate had a significantly reduced scratch resistance compared to the TMCD-free comparative coating material from example 5, the scratch resistance of the coating films according to the invention (examples 2 and 4), in particular in the case of wet scratching, was at a similarly high level as the standard 2K PUR coating material (example 5). The two coating films according to the invention displayed the lowest direct scratching (highest residual gloss before recovery) and by far the best solvent resistance and tree resin resistance, compared to all the comparative coating materials.

The invention claimed is:

1. A coating composition containing

A) at least one polyol component,

B) at least one crosslinker component having free and/or blocked isocyanate groups obtained by reaction of at least one polyisocyanurate based on 1,6-diisocyanatohexane with at least one amino-functional alkoxysilane comprising N-(n-butyl)-3-aminopropyltrimethoxysilane and bis(3-trimethoxysilylpropyl) amine, optionally C) at least one catalyst for the crosslinking of silane groups, and D) optionally further auxiliaries and additives, wherein the polyol component A) comprises at least one polyester polyol A1) prepared using a 2,2,4,4-tetraalkylcyclobutane-1,3-diol (TACD) of the general formula (I)

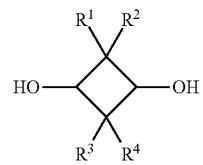

(I)

in which the radicals $R^1$, $R^2$, $R^3$ and $R^4$ are independently linear or branched alkyl radicals having up to 8 carbon atoms.

2. The coating composition as claimed in claim 1, wherein the radicals $R^1$, $R^2$, $R^3$ and $R^4$ in general formula (I) are independently linear or branched alkyl radicals having up to 6 carbon atoms.

3. The coating composition as claimed in claim 1, wherein the radicals $R^1$, $R^2$, $R^3$ and $R^4$ in general formula (I) are each a methyl radical.

4. The coating composition as claimed in claim 1, wherein preparation of the polyester polyol A1) involves including 2,2,4,4-tetraalkylcyclobutane-1,3-diols (TACDs) of general formula (I) in amounts that the TACD content in the total amount of polyhydric alcohols used is at least 10 mol %.

5. The coating composition as claimed in claim 1, wherein the polyester polyols A1) have a hydroxyl group content of 1.5% to 15% by weight, an acid number of 0 to 80 mg KOH/g and number-average molecular weights (Mn) of 300 to 10 000 g/mol.

6. The coating composition as claimed in claim 1, wherein the polyol component A) comprises further polyols A2) which are different from A1), selected from the group consisting of TACD-free polyester polyols, polyether polyols, polycarbonate polyols, polyacrylate polyols, and mixtures of those polyols, and wherein the content of polyester polyols A1) in the overall polyol component A) is at least 10% by weight.

7. The coating composition as claimed in claim 1, wherein preparation of crosslinker component B) further includes aminosilanes of the general formula (III)

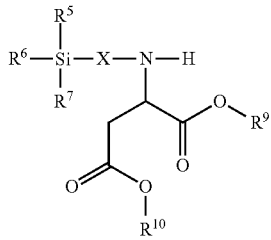

(III)

wherein $R^5$, $R^6$ and $R^7$ are identical or different radicals and are each a saturated or unsaturated, linear or branched, aliphatic or cycloaliphatic or an optionally substituted aromatic or araliphatic radical which has up to 18 carbon atoms and may optionally contain up to 3 heteroatoms selected from the group consisting of oxygen, sulfur and nitrogen, X is a linear or branched organic radical having at least 2 carbon atoms and $R^9$ and $R^{10}$ independently of one another are saturated or unsaturated, linear or branched, aliphatic or cycloaliphatic or aromatic organic radicals which have 1 to 18 carbon atoms, are substituted or unsubstituted and/or have heteroatoms in the chain.

8. The coating composition as claimed in claim 1, wherein preparation of crosslinker component B) further includes aminosilanes of the general formula (V)

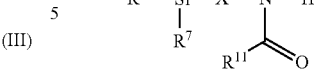

(V)

wherein $R^5$, $R^6$ and $R^7$ are identical or different radicals and are each a saturated or unsaturated, linear or branched, aliphatic or cycloaliphatic or an optionally substituted aromatic or araliphatic radical which has up to 18 carbon atoms and may optionally contain up to 3 heteroatoms selected from the group consisting of oxygen, sulfur and nitrogen X is a linear or branched organic radical having at least 2 carbon atoms and $R^{11}$ is a saturated linear or branched, aliphatic or cycloaliphatic organic radical having 1 to 8 carbon atoms.

9. The coating composition as claimed in claim 1, wherein catalysts C) are selected from the group consisting of phosphoric esters, phosphonic esters, sulfonic acids, which may optionally be in amine-blocked form, and tetraalkylammonium carboxylates.

10. The coating composition as claimed in claim 1, wherein catalysts C) are selected from the group consisting of amine-blocked phenyl phosphate, bis(2-ethylhexyl) phosphate, tetraethylammonium benzoate, tetrabutylammonium benzoate, and mixtures thereof.

11. A method for producing coatings comprising providing the coating composition as claimed in claim 1.

12. A process for producing coatings and paint systems comprising providing the coating composition as claimed in claim 1.

13. A substrate coated with at least one coating composition as claimed in claim 1.

* * * * *